(12) United States Patent
Pusheck et al.

(10) Patent No.: US 10,690,524 B2
(45) Date of Patent: Jun. 23, 2020

(54) LOCK CLIP FOR ELECTRICAL SENSOR CONNECTION

(71) Applicant: Autoliv ASP, Inc., Ogden, UT (US)

(72) Inventors: Jacob Pusheck, Waterford, MI (US); Joshua Forwerck, Royal Oak, MI (US)

(73) Assignee: VEONEER US, INC., Southfield, MI (US)

( * ) Notice: Subject to any disclaimer, the term of this patent is extended or adjusted under 35 U.S.C. 154(b) by 208 days.

(21) Appl. No.: 15/788,787

(22) Filed: Oct. 19, 2017

(65) Prior Publication Data

US 2019/0120669 A1 Apr. 25, 2019

(51) Int. Cl.
*G01D 11/30* (2006.01)
*F16B 2/24* (2006.01)
*G01D 11/24* (2006.01)

(52) U.S. Cl.
CPC .............. *G01D 11/30* (2013.01); *F16B 2/241* (2013.01); *G01D 11/245* (2013.01)

(58) Field of Classification Search
CPC ...................................................... G01D 11/30
See application file for complete search history.

(56) References Cited

U.S. PATENT DOCUMENTS

| 6,018,992 A * | 2/2000 | Kaijala ............... G01D 5/02 73/114.36 |
| 8,721,351 B2 * | 5/2014 | Nitta ................... G01B 7/003 439/76.1 |
| 2003/0107491 A1 * | 6/2003 | Sasaki ............... G01L 19/0084 340/626 |
| 2004/0217385 A1 * | 11/2004 | Barrenscheen .... G05B 19/0428 257/203 |
| 2009/0163052 A1 * | 6/2009 | Zhu ..................... H01R 9/096 439/74 |
| 2014/0137656 A1 * | 5/2014 | Henzler ............... G01D 11/245 73/756 |
| 2018/0090868 A1 * | 3/2018 | Forwerck ............. G01L 19/0069 |

FOREIGN PATENT DOCUMENTS

| DE | 102005021039 | 11/2006 |
| JP | 2002 333377 | 11/2002 |
| WO | WO 2009/121426 A2 | 10/2009 |
| WO | WO 2017/76743 A1 | 5/2011 |
| WO | WO 2016/096253 A1 | 6/2016 |

OTHER PUBLICATIONS

International Search Report, International Application No. PCT/US2018/056272, dated Dec. 27, 2018, 3 pgs.

* cited by examiner

*Primary Examiner* — Jamel E Williams
(74) *Attorney, Agent, or Firm* — Dickinson Wright PLLC

(57) ABSTRACT

A mountable sensor assembly for mounting on a vehicle assembly is provided. The mountable sensor assembly may include a sensor circuit, a sensor housing, a connector pin, and a clip. The sensor circuit may have at least one conducting pad. The sensor housing may include a sensor cavity that receives the sensor circuit. The sensor housing may have a connector cavity that is separated from the sensor cavity by a housing wall. The connector pins may extend through the housing wall between the connector cavity and the sensor cavity. The clip may be fastened to the sensor housing and may be formed of a conductive material. The clip may be configured to engage the conducting pad and the corresponding connector pin to provide electrical continuity between the conducting pad and the corresponding connector pin.

20 Claims, 8 Drawing Sheets

LOCK CLIP FOR ELECTRICAL SENSOR CONNECTION

BACKGROUND

The present application relates generally to a conductive clip for sensor attachment.

BRIEF SUMMARY

In satisfying the above need, as well as overcoming the enumerated drawbacks and other limitations of the related art, the present application provides a conductive fastening clip that provides connection between connector pins and sensor pads. The fastening clip may provide electrical connection and also physically constrain the position of the sensor though the spring force. Various configurations of barbs, wings, and openings may be used as described in the disclosure.

In one implementation, a mountable sensor assembly for mounting on a vehicle assembly is provided. The mountable sensor assembly may include a sensor circuit, a sensor housing, a connector pin, and a clip. The sensor circuit may have at least one conducting pad. The sensor housing may include a sensor cavity that receives the sensor circuit. The sensor housing may have a connector cavity that is separated from the sensor cavity by a housing wall. The connector pins may extend between the connector cavity and the sensor cavity. The clip may be fastened to the sensor housing and may be formed of a conductive material. The clip may be configured to engage the conducting pad and the corresponding connector pin to provide electrical continuity between the conducting pad and the corresponding connector pin.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Figure 1:
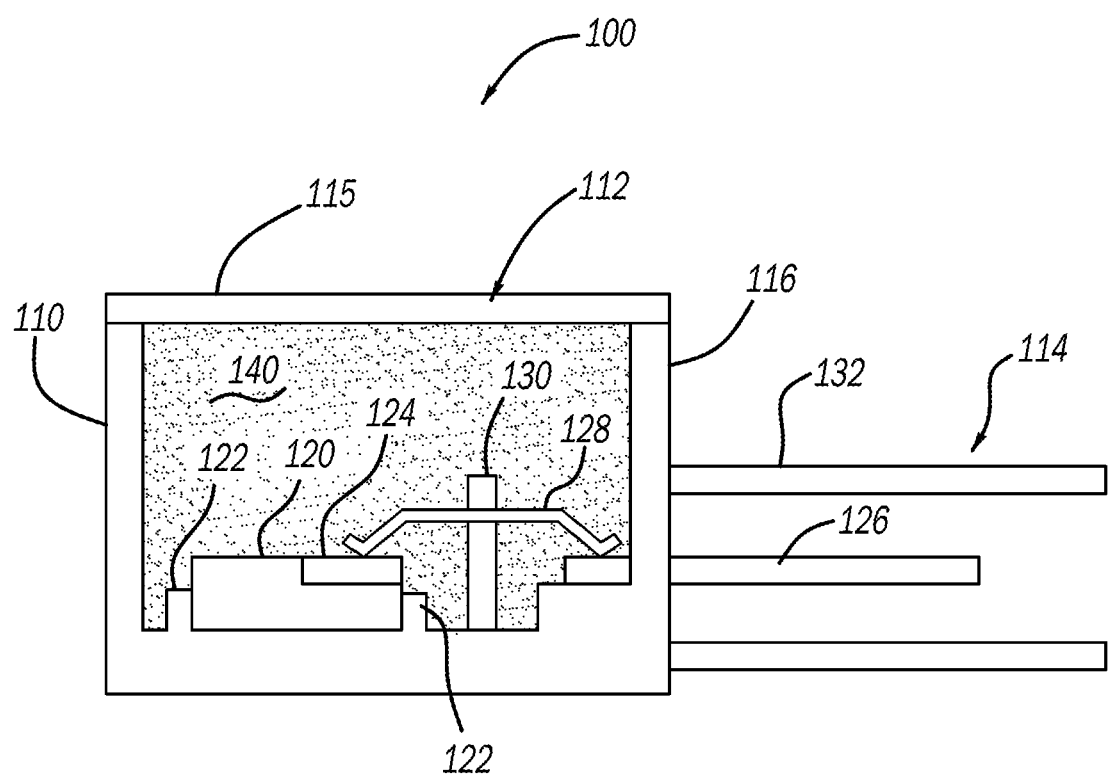
FIG. 1 is a schematic side view of a sensor assembly.

Low cost solutions currently drive design goals with satellite crash sensors. With this design directive, one option to reduce cost is implementing a less expensive overall electrical package. In one implementation, the use of a single chip component eliminates the need to use a PCB with discrete components. Often filtering is done by discrete components within the sensor assembly. One design hurdle that must be overcome to use this type of sensing component is creating and maintaining a robust electrical connection from the sensor to the connector leads or "pins". The designs discussed herein can provide improved reliability by developing a robust electrical connection over the life of the sensor.

In some of the implementations discussed a connection between a sensing component and the pins of an electrical connector may be provided directly by a clip. The clip may be a leaf spring formed from a conductive material to generate positive compression on the sensor leads and pins over life of the sensor assembly. In some implementations an initial retention feature may maintain the positive pressure generated by the leaf spring. Further, a potting material may be injected over the leaf spring clip, sensor, and pins.

In some designs a "Tinnerman" type clip may be used to retain the leaf spring to a guiding post. A robust connection can be important to guarantee that communication signals and power can be transmitted between the sensor and a central controlling module. This connection could be robust enough to withstand environmental conditions as well as sustain a high acceleration impact. The leaf spring may be formed from a conductive material to reduce passive resistance losses and residual heating. The initial retention feature may be used to hold the leaf spring before potting is injected to secure the system fully. This feature may also insure that the leaf spring is in the correct orientation and position to make appropriate contact with the two surfaces. A winged design would allow for further retention of the clip.

Potting can provide environmental protection, as well as, mechanical retention by constraining the components to the position in which they were initially placed. A "Tinnerman" clip type designed leaf spring may be used to allow for single axis assembly. The clip may just need to be pushed onto the guiding post and the clip will hold itself down thereafter. A stitched clip design could allow for increased retention of the clip during manufacturing. A domed clip design may be resistant to wear such as when the friction removes the plating or grinds off the point of the contact domes the contact area increases to maintain electrical connection. Also, this method of connection may be more robust that a planar connection as it allows for increased flexing of the clip.

The designs discussed allow for straight terminal connector pins to be used. As such, the terminal may be "stitched" into the housing plastic. This can drastically reduce the base cost of the housing as well as reducing the cost of the pins as they can be stamped from a metallic reel. The implementations described may also allow for a chip to be used without a PCB. This can drastically reduce cost by removing several components.

FIG. 1 is a sectional side view of the sensor assembly 100. The sensor assembly 100 may include a housing 110. The housing 110 may be formed of a plastic material and may, for example, be injection molded. The housing 110 may include a cavity 112 and a connector 114. The cavity 112 may receive a sensor 120, for example an accelerometer, pressure sensor, sound sensor, or gyroscope. The sensor 120 may be located and secured within the cavity 112 by retaining features 122. The retaining features 122 may be formed as part of the plastic housing 110. A sensor 120 may be a single silicon chip. However, in some limitations, sensor 120 may include a packaged chip or include a circuit board (PCB). The sensor 120 may include one or more conductive pads 124. In some implementations, the conductive pads 124 may be exposed portions on the single silicon chip. In some implementations, the conductive pad 124 may be copper pads. The conductive pads 124 are exposed for contact to make an electrical connection with other components.

An electrically conductive clip 128 may be in contact with the conductive pad 124 to make an electrical connection with a corresponding connector pin 126. The conductive clip 128 may be a copper clip. The conductive clip 128 may be in direct contact to engage the conductive pad 124 and in direct contact with the connector pin 126 to provide a secure and efficient electrical connection between the conductive pads 124 of the sensor 120 and the connector pin 126. Connector pin 126 may be engaged by the clip 128 within the cavity 112, and may extend through a wall 116, and protrude into the connector 114. The connector 114 includes a plastic shroud 132 to protect the physical and electrical integrity of the connector pin 126, and maintain connection and sealing with the electrical connector. While a single connector pad, clip, and connector pin group are shown in FIG. 1, multiple pad, clip, and pin groups may be present in a single sensor assembly 100.

A post 130 may extend from the housing 110. In some implementations, the post 130 may be integrally formed as part of the connector hosing 110. In some implementations, the post 130 may be inserted and locked within the housing unit 110. The post 130 may have features to locate and orient the clip 128 relative to the connector pin 126 and the sensor 120. For example, the position of the post 130 may be fixed relative to the wall 116 and the retaining features 122 to maintain the relative position of the sensor, clip, and pin within the group. The post 130 may have features to fix the position and orientation of the clip in three dimensions relative to the other components of the group, as well as, the housing 110. Further, the post 130 may exert a downward force on the clip 128 causing the clip 128 to apply pressure to the sensor 120 and the connector pins 126. By doing so, the clip 128 may lock the sensor 120 into place against the housing 110 and the retaining features 122. Further, the clip 128 may lock in connector pin 126 into position relative to the wall 116 and/or the connector 114.

The cavity 112 may be filled with a potting 140. The potting 140 may be made of a non-conductive material that may be applied in liquid form and hardened or solidified. The potting 140 may reinforce the position of the components within the cavity 112, as well as, prevent any electrical shorts or faults within the sensor assembly 100. A cover 115 may be provided to seal the cavity 112, protecting the components within the cavity 112 from external conditions.

Figure 2:
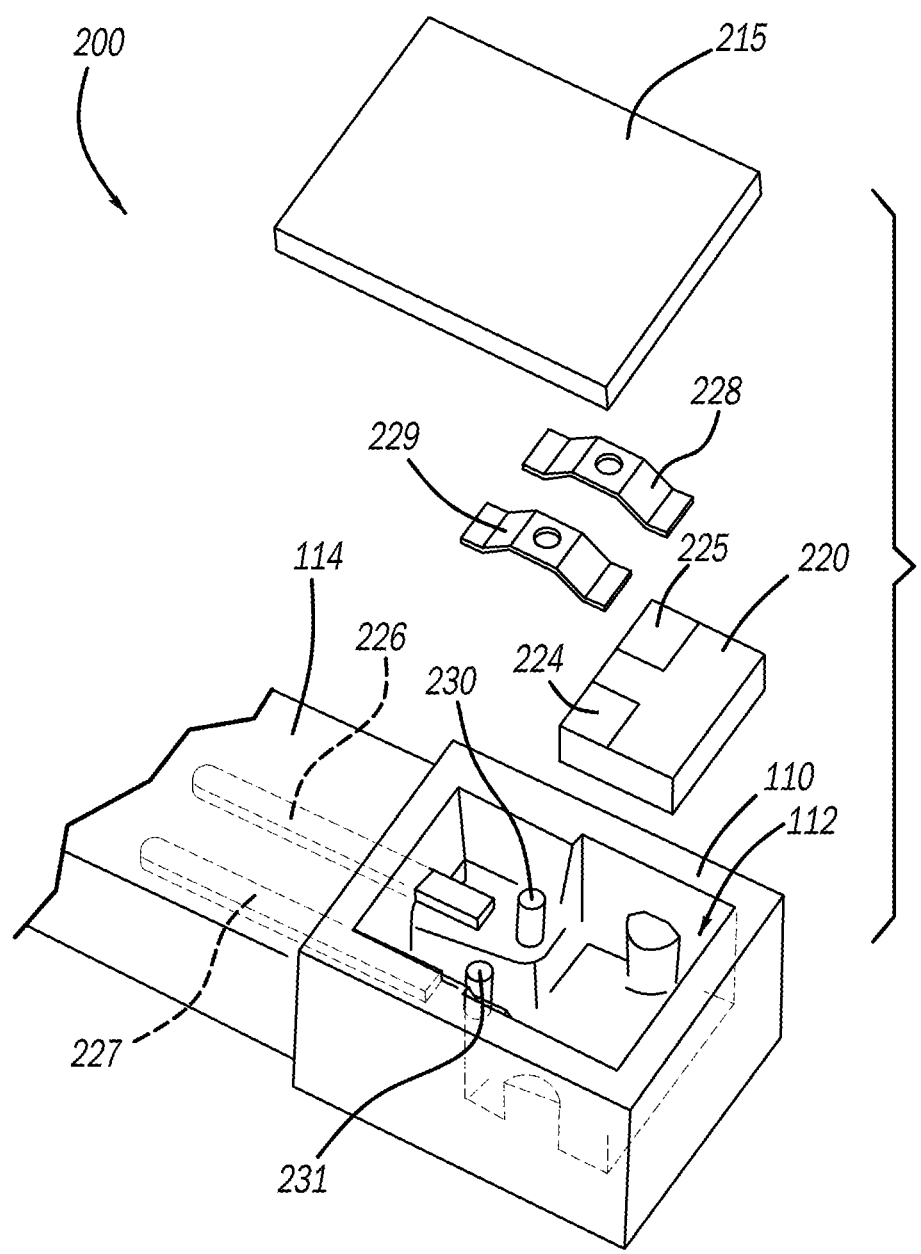
FIG. 2 is an exploded perspective view of one implementation of the sensor assembly.

FIG. 2 is an exploded perspective view of one implementation of the sensor assembly 200. The sensor 220 includes two conductive pads 224 and 225. As such, two corresponding clips 228, 229 may be provided to form an electrical connection from the pads 224 and 225 to pins 226 and 227, respectively. A cover 215 may be provided to seal the cavity 112 from external elements.

Figure 3:
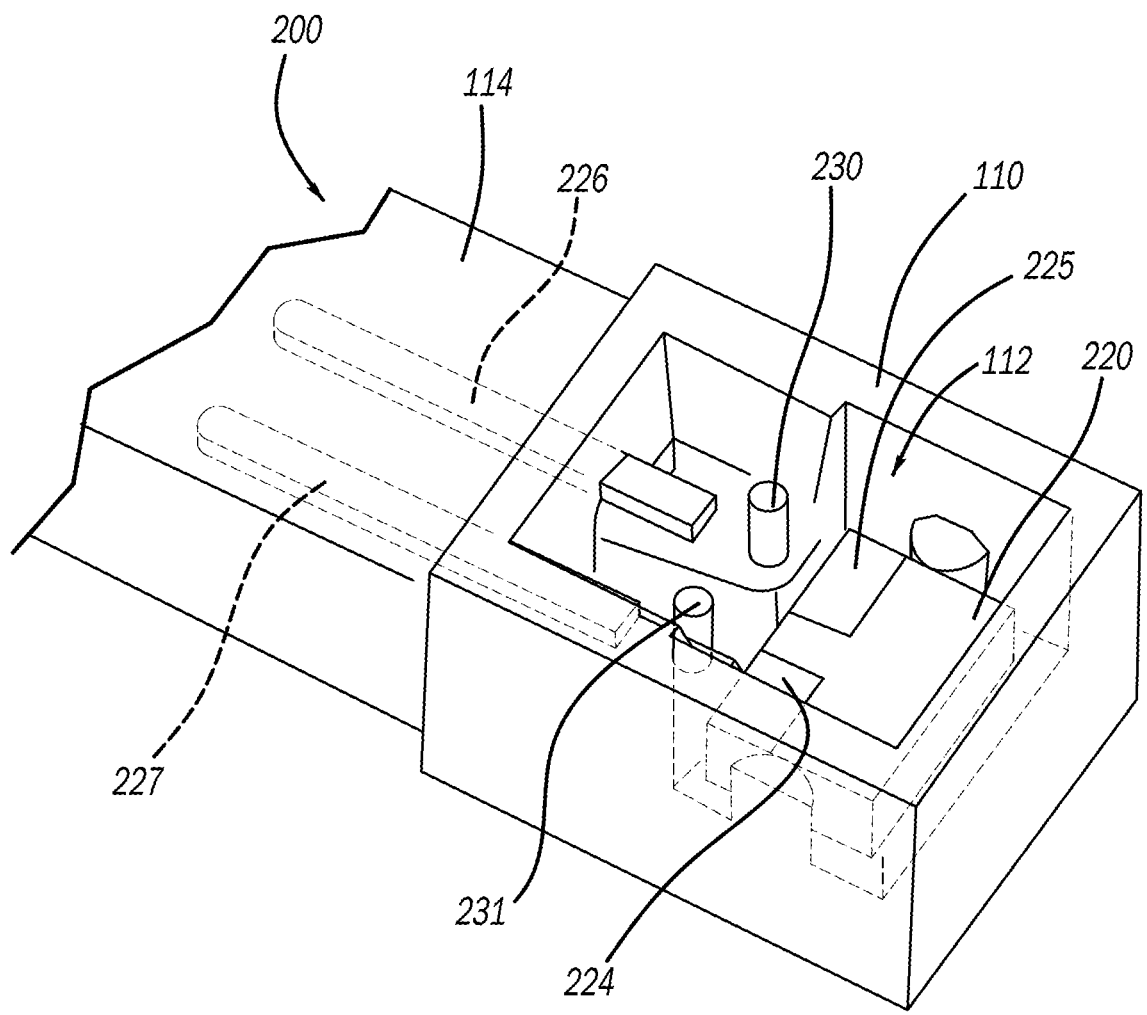
FIG. 3 is a perspective view of the sensor assembly with the sensor inserted.

FIG. 3 is a perspective view of the sensor assembly 200 with the sensor 220 inserted into the cavity 112. The orientation of the sensor 220 may be fixed by features within the cavity 112.

Figure 4:
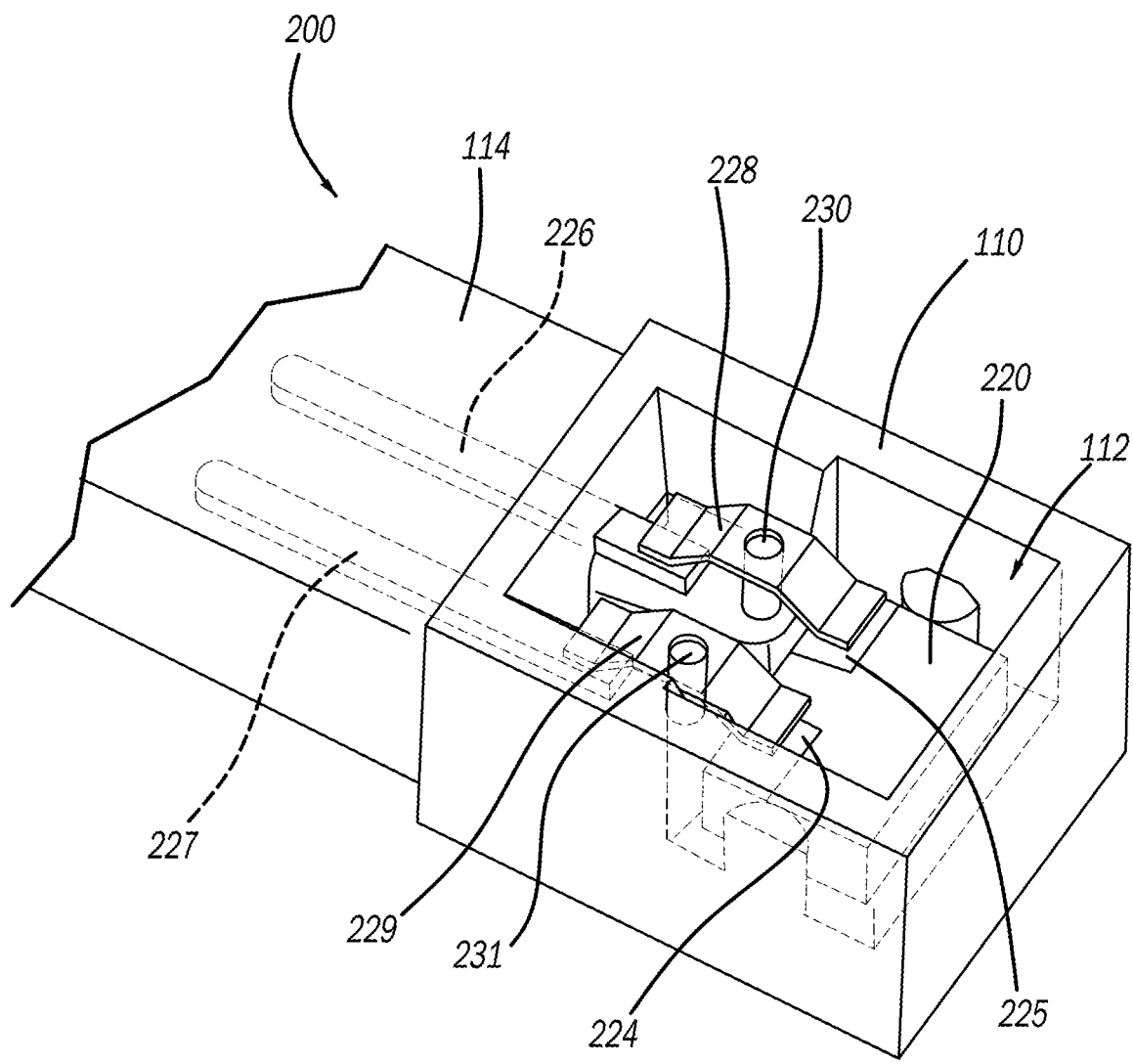
FIG. 4 is a perspective view of the sensor assembly illustrating the clips being inserted.

FIG. 4 is a perspective view of the sensor assembly 220 illustrating the clips 228, 229 being inserted onto the posts 230, 231. One end of the clips 228, 229 is oriented over a pad 224, 225, while the opposite end is oriented over a respective pin 226, 227.

Figure 5:
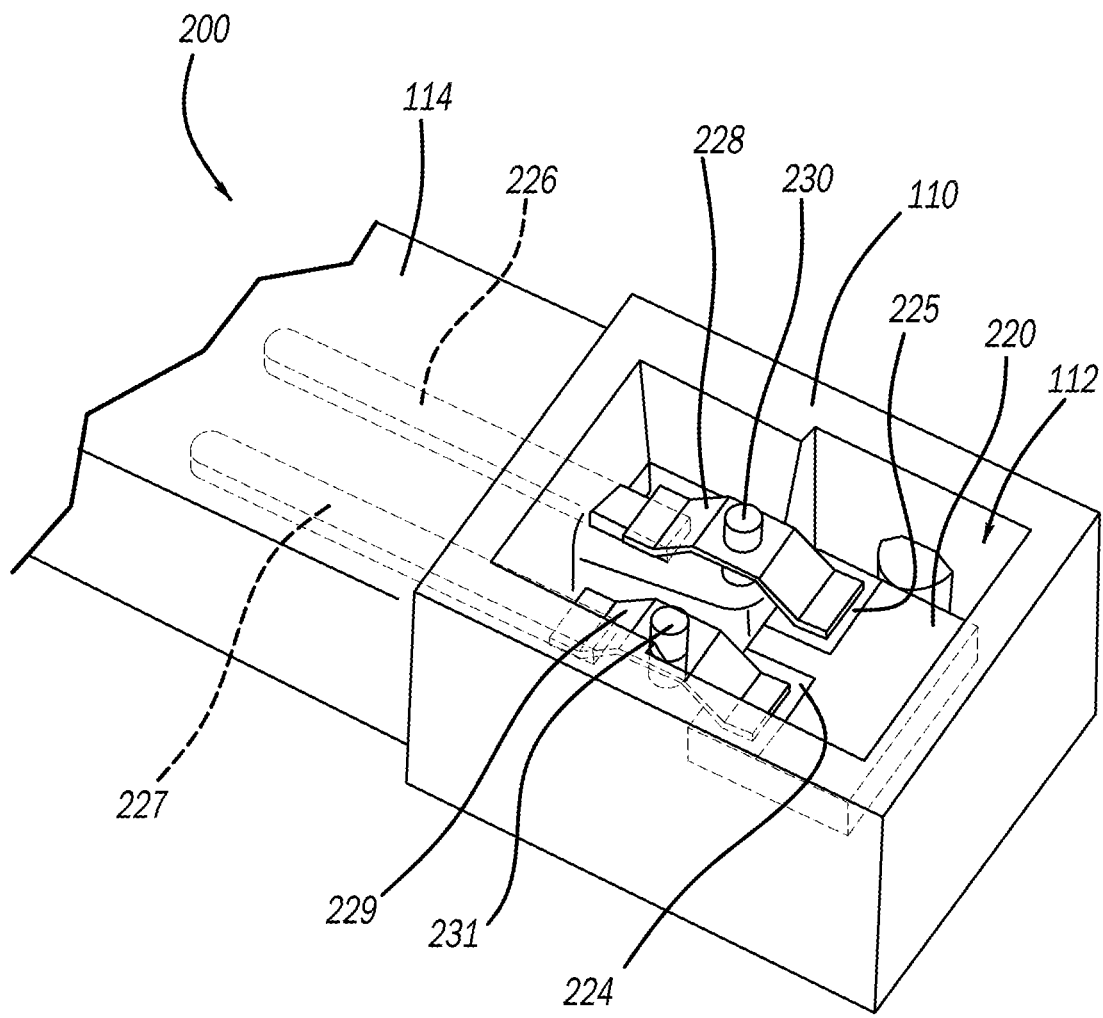
FIG. 5 is a perspective view of the assembled sensor assembly without the cover.

FIG. 5 is a perspective view of the assembled sensor assembly 200 without a cover. As clip 228 is seated on post 230 and clip 229 are seated on the post 231, a locking mechanism such as a ridge or finger lock each of the clips onto the post. Pad 224 is connected to pin 227 though clip 229. Similarly, pad 225 is connected to pin 226 through clip 228. In the implementations where multiple clips are used, the posts 230 and 231 may provide anti-rotation features to ensure stable location and orientation of the clips relative to each other and other components within the cavity 112. Further, the conducting pad may be a power voltage pad, a ground pad, or a communication signal pad. As such, the clip may conduct power, electrical ground, or a communication signal from the conducting pad to the corresponding connector pin.

Figure 6A:
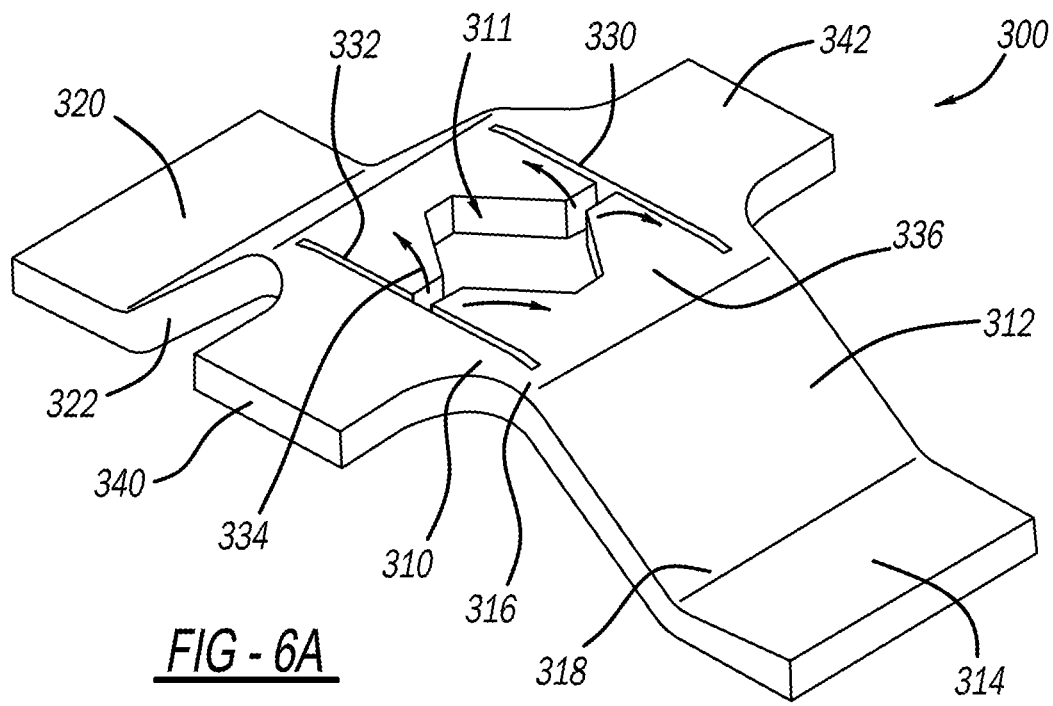
FIGS. 6A and 6B are perspective views that illustrate one implementation of a clip design.
Figure 6B:
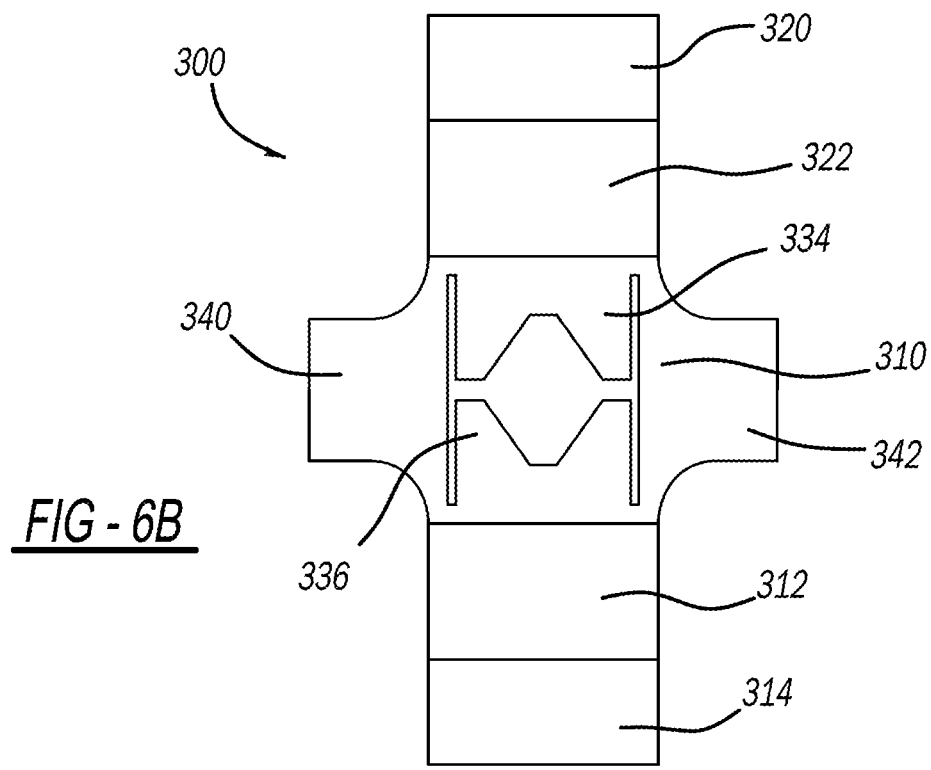

FIGS. 6A and 6B illustrate a clip design with certain features that may be implemented into any of the designs discussed herein. Clip 300 may include a mounting portion 310. The mounting portion 310 may include an opening 311 allowing a mounting post to extend therethrough. The mounting portion 310 may be connected to a first contact portion 314 through an arm 312. The contact portion 314 may be configured to directly engage pads on the sensor or on the connector pin. As such, the contact portion 314 may include certain plating to improve the electrical continuity between the clip 300 and other components (e.g., the sensor or connector pins) within the sensor assembly. The clip 300 may include a bend 316 between the mounting portion 310 and the arm 312. Further, the clip 300 may include a bend 318 between the arm and the first contact portion 314. The bends 316 and 318 may be configured to produce a spring force between the post connected to the mounting portion 310 and the first contact portion 314 in connection with the sensor pads or connector pins. As such, the arm 312 may form an angle with respect to the mounting portion, for example an angle of between 10 and 50 degrees. The contact portion 314 may be parallel to the mounting portion 310. However, in some implementations the connection portion 314 may form an angle with respect to the mounting portion 310.

In a similar manner, the mounting portion 310 may be connected to a second contact portion 320 through arm 322. In a similar manner to the first connection portion 314 and arm 312, arm 322 and second connection portion 320 may include bends that cause a spring-force to be applied between the mounting post and the component which the second connection portion 320 is in contact with. The arm 312 and first connection portion 314 may be symmetric with the arm 322 and second connection portion 320. As such, a symmetrical tension may be applied between the post and the components (e.g., sensor and connector pin) within the sensor assembly. In a symmetrical tension scenario, the clip 300 may be self-centering adding to the stability of the sensor, clip, connector pin group.

The opening 311 may have a polygon configuration with multiple straight sides to constrain the orientation of the clip relative to the mounting post. In addition, slots 330 and 332 may be provided in the clip 300. The slots 330 and 332 may extend beyond the opening 311 allowing a first portion 334 of the mounting portion 310 to deflect upward as the post passes through the opening 311 (as demonstrated with arrows in FIG. 6A). On the other side, a second portion 336 of the mounting portion 310 may also deflect upwardly as the post is inserted through the opening 311 (as demonstrated with arrows in FIG. 6A. The post may have a feature (e.g. a barb) such that after it is extended through the opening 311, the feature may lock against the first portion 334 and the second portion 336 of the mounting portion 310. As such, the first portion 334 and the second portion 336 may engage the post to provide a retention force resisting removal for the clip 300.

In addition, the clip 300 may include wings 340 and 342. The wings 340 and 342 may extend perpendicular to the arms 312 and 322. The wings 340 and 342 may serve to prevent rotation and/or generally lock the position and orientation of the clip 300 relative to other features, for example, features within the wall of the housing or extending from the floor of the cavity and that may form an integral part of the plastic housing.

Figure 7A:
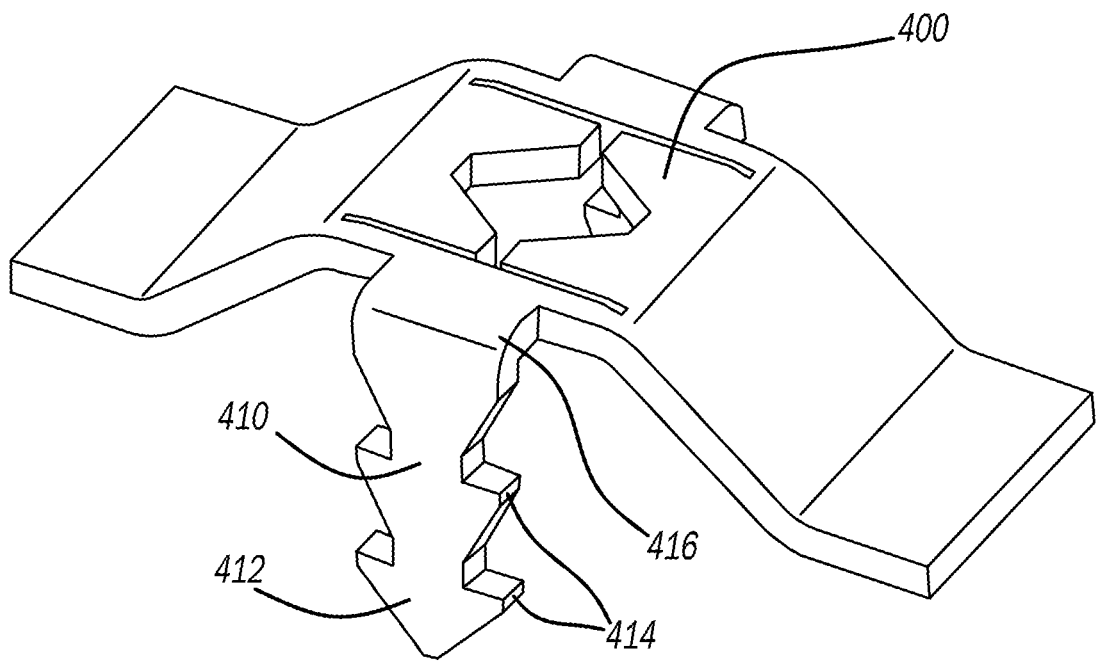
FIGS. 7A and 7B are perspective views that illustrate one implementation of a clip design.
Figure 7B:
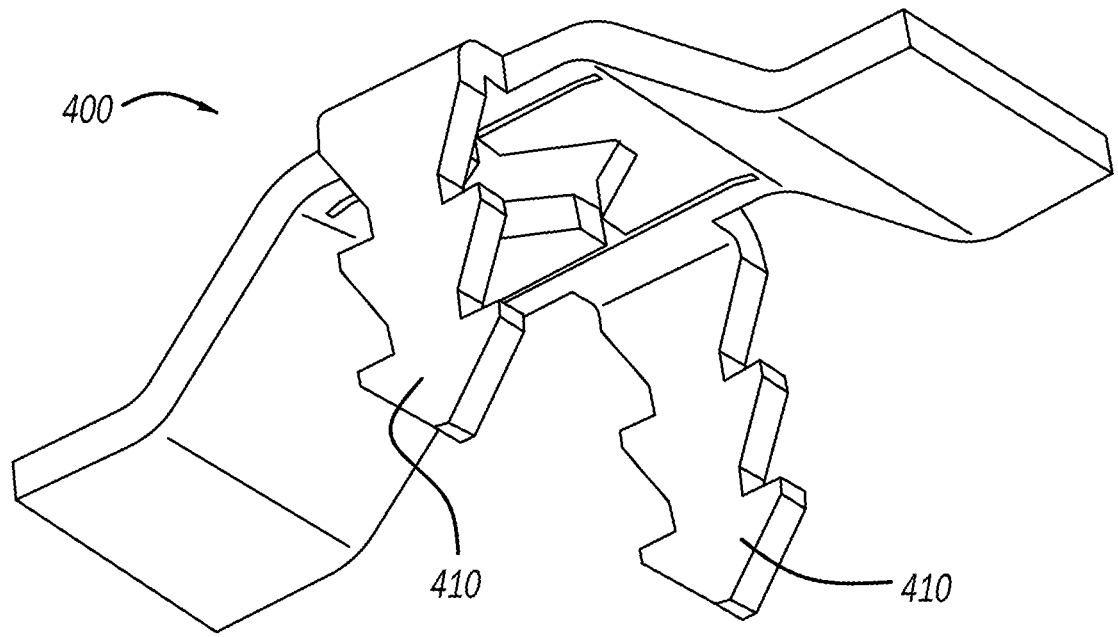

FIGS. 7A and 7B illustrate other exemplary features that may be applied to the clip designs described herein. Clip 400 includes one or more barbed retaining portions 410. The barbed retaining portion 410 may include a pointed tip 412 extending to the end of the retaining portion 410 to center the retaining portion relative to an opening in the housing. Further, the retaining portion 410 may include barbs 414 that may lock the clip 400 into the opening in the housing. Multiple sets of barbs 414 may be used to lock the clip 400 in different positions and, therefore, apply different spring forces between the attachment point at the housing and the components that the clip 400 engages (e.g., the sensor and connector pin). Further, the retaining portion 410 may include a bend 416 to orient the retaining portion 410 perpendicular to the mounting portion. As such, the retaining portion 410 may run parallel to the mounting post. Although in some implementations, the post may be replaced by the retaining portions 410 to secure the position and orientation of the clip relative to other components, as well as, provide a spring force between the housing and other components.

Figure 8:
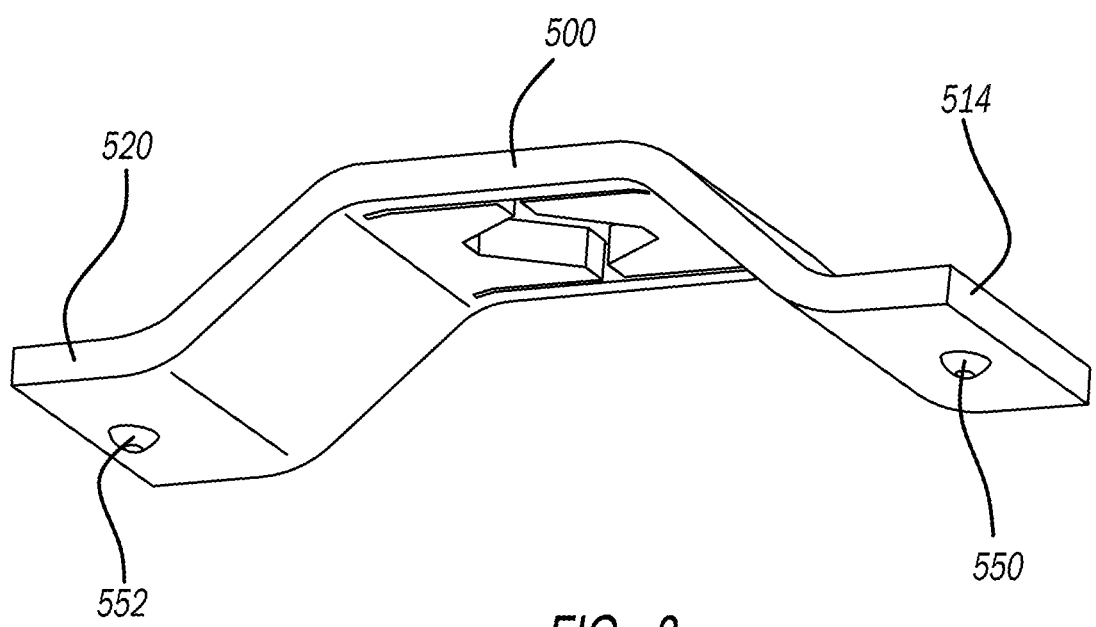
FIG. 8 is an perspective view that illustrates an implementation of a clip design with contact domes.

FIG. 8 illustrates a domed design that may be applied to the other implementations described herein. Clip 500 includes a contact dome 550 on a bottom surface of the first contact portion 514. Similarly, a second contact dome 552 may be located on the bottom surface of the second contact portion 520. The contact domes 550 and 552 may be in the form of a half sphere or oval and therefore provide a smaller contact point between the clip and the component to which each contact portion engages, for example the sensor pad or connector pin. The dome may take the form of an elongated elliptical dome such that a linear or planar contact region is provided, rather than a point contact provided by a hemispherical dome. The contact portions may include a single dome or may include a pattern with multiple contact domes. Further, the shape and frequency of the contact domes may change the contact resistance between the clip and the component to which a clip connects. The contact domes may also be plated or formed of a different material than the clip to provide different contact resistances for particular applications.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly for mounting on a vehicle assembly, the mountable sensor assembly comprising:
   a sensor circuit having at least one conducting pad;
   a sensor housing comprising a sensor cavity that receives the sensor circuit, the sensor housing having a connector cavity, the connector cavity and the sensor cavity being separated by a housing wall;
   at least one connector pin extending through the housing wall between the connector cavity and the sensor cavity; and
   a clip fastened to the sensor housing, the clip being formed of a conductive material, the clip being configured to engage one of the conducting pads and a corresponding one of the connector pins to provide electrical continuity between the one of the conducting pads and the corresponding one of the connector pins;
   a post located between the one of the connector pins and the one of the conducting pads wherein the clip attaches to the post and a spring force of the clip pushes against the post to provide the positive pressure against the one of the conducting pads and the one of the connector pins.

2. A mountable sensor assembly for mounting on a vehicle assembly, the mountable sensor assembly comprising:
   a sensor circuit having at least one conducting pad;
   a sensor housing comprising a sensor cavity that receives the sensor circuit, the sensor housing having a connector cavity, the connector cavity and the sensor cavity being separated by a housing wall;
   at least one connector pin extending through the housing wall between the connector cavity and the sensor cavity; and
   a clip fastened to the sensor housing, the clip being formed of a conductive material, the clip being configured to engage one of the conducting pads and a corresponding one of the connector pins to provide electrical continuity between the one of the conducting pads and the corresponding one of the connector pins;
   the clip comprising barbed portions extending into and engaging the sensor housing.

3. The mountable sensor assembly according to claim 1, wherein the post has an anti-rotation feature to prevent rotation of the clip.

4. The mountable sensor assembly according to claim 1, wherein the clip comprises wings that restrict rotation of the clip.

5. The mountable sensor assembly according to claim 1, further comprising potting filling the cavity, and a cover enclosing the cavity.

6. The mountable sensor assembly according to claim 1, further comprising a contact dome formed in the clip that engages the one of the conducting pads or the one of the connector pins.

7. The mountable sensor assembly according to claim 6, further comprising a pattern of contact domes formed in the clip that engage the one of the conducting pads or the one of the connector pins.

8. The mountable sensor assembly according to claim 1, wherein the clip having a mounting portion for attaching to the post and contact portions for contacting the conducting pads, wherein the mounting portion is not symmetrically spaced from each of contact portions.

9. The mountable sensor assembly according to claim 8, wherein the mounting portion includes deflecting portions with distal ends that deflect away from the contact portions when inserted onto a mounting post.

10. The mountable sensor assembly according to claim 1, further comprising a second clip fastened to the sensor housing, the second clip being formed of a conductive material, the second clip being configured to engage a second of the conducting pads and a corresponding second of the connector pins to provide electrical continuity between the second of the conducting pads and the corresponding second of the connector pins.

11. The mountable sensor assembly according to claim 1, wherein the one conducting pad is a power voltage pad and the clip conducts power from the power voltage pad to the one connector pin or the one conducting pad is a communication signal pad and the clip transmits a communication signal from the communication signal pad to the one connector pin.

12. The mountable sensor assembly according to claim 1, wherein a mounting portion of the clip includes deflecting portions with distal ends that deflect away from contact portions of the clip when inserted onto a mounting post.

13. The mountable sensor assembly according to claim 1, wherein the post extends through an opening in the clip.

14. The mountable sensor assembly according to claim 2, wherein the clip provides a positive pressure against the one of the conducting pads and the one of the connector pins.

15. A mountable sensor assembly for mounting on a vehicle assembly, the mountable sensor assembly comprising:
   a sensor chip having at least one conducting pads;
   a sensor housing comprising a sensor cavity that receives the sensor chip, the sensor housing having a connector cavity, the connector cavity and the sensor cavity being separated by a housing wall;
   at least one electrically conductive connector pins extending between the connector cavity and the sensor cavity; and
   a clip fastened to the sensor housing, the clip being formed of a conductive material, the clip being configured to engage one of the conducting pads and a corresponding one of the connector pins to directly connect between the one of the conducting pads and the corresponding one of the connector pins;
   a post located between the one of the connector pins and the one of the conducting pads, the clip being attached to the post.

16. The mountable sensor assembly according to claim 15, wherein the clip attaches to the post and a spring force of the clip pushes against the post to provide positive pressure against the one of the conducting pads and the one of the connector pins.

17. The mountable sensor assembly according to claim 15, further comprising a contact dome formed in clip that engages the one of the connector pins.

18. The mountable sensor assembly according to claim 15, wherein the post extends through an opening in the clip.

19. A mountable sensor assembly for mounting on a vehicle assembly, the mountable sensor assembly comprising:
   a sensor circuit having at least one conducting pads;
   a sensor housing comprising a sensor cavity that receives the sensor circuit, the sensor housing having a connector cavity, the connector cavity and the sensor cavity being separated by a housing wall;
   at least one electrically conductive connector pins extending between the connector cavity and the sensor cavity;
   a post attached to the sensor housing; and
   a clip fastened to the sensor housing, the clip being formed of a conductive material, the clip being configured to engage one of the conducting pads and a corresponding one of the connector pins to provide electrical continuity between the one of the conducting pads and the corresponding one of the connector pins, the clip being attached to the post and a spring force of the clip pushes against the post to provide positive pressure against the one of the conducting pads and the one of the connector pins.

20. The mountable sensor assembly according to claim 19, wherein the post extends through an opening in the clip.

\* \* \* \* \*